(12) United States Patent
Simon et al.

(10) Patent No.: US 6,293,206 B1
(45) Date of Patent: Sep. 25, 2001

(54) PORTABLE FOLDING TRAY FOR VEHICLES

(76) Inventors: Clayton N. Simon; Elizabeth T. Simon, both of 831 Mobile Ct., Shreveport, LA (US) 71115

(*) Notice: Subject to any disclaimer, the term of this patent is extended or adjusted under 35 U.S.C. 154(b) by 0 days.

(21) Appl. No.: 09/760,505

(22) Filed: Jan. 16, 2001

(51) Int. Cl.[7] .................................................. A47B 37/00
(52) U.S. Cl. ................................................ 108/46; 108/147
(58) Field of Search ................................. 108/42, 46, 44, 108/135, 147; 248/297.21, 206.2; 224/482, 559, 564

(56) References Cited

U.S. PATENT DOCUMENTS

| | | |
|---|---|---|
| 2,593,222 * | 4/1952 | Tracy ..................................... 108/46 |
| 5,106,003 | 4/1992 | Ma . |
| 5,143,337 | 9/1992 | Tomayko, Jr. . |
| 5,443,018 | 8/1995 | Cromwell . |
| 5,511,593 | 4/1996 | Kanehl, Jr. . |
| 5,667,119 | 9/1997 | Florence . |
| 5,953,999 | 9/1999 | Kanehl . |
| 6,095,060 | 8/2000 | Ma . |

FOREIGN PATENT DOCUMENTS

47195 * 4/1933 (DK) ...................................... 108/46

* cited by examiner

*Primary Examiner*—Peter M. Cuomo
*Assistant Examiner*—Jerry A. Anderson
(74) *Attorney, Agent, or Firm*—John M. Harrison

(57) ABSTRACT

A portable folding tray for use in vehicles, which tray includes a bi-folding tray element pivotally attached to a tray mount that is fitted with a pair of extendible suction cups for removable attachment of the tray mount to the window of a vehicle. A rotatable tray adjustment bolt fitted in the tray mount threadably engages a pair of tray arms that mounts the tray to facilitate selectively raising and lowering the bi-folding tray of the window-mounted tray mount. A pair of tray leveling bolts can be adjustably extended from the tray mount to facilitate horizontal leveling of the tray by engaging the vehicle window beneath the suction cups.

9 Claims, 5 Drawing Sheets

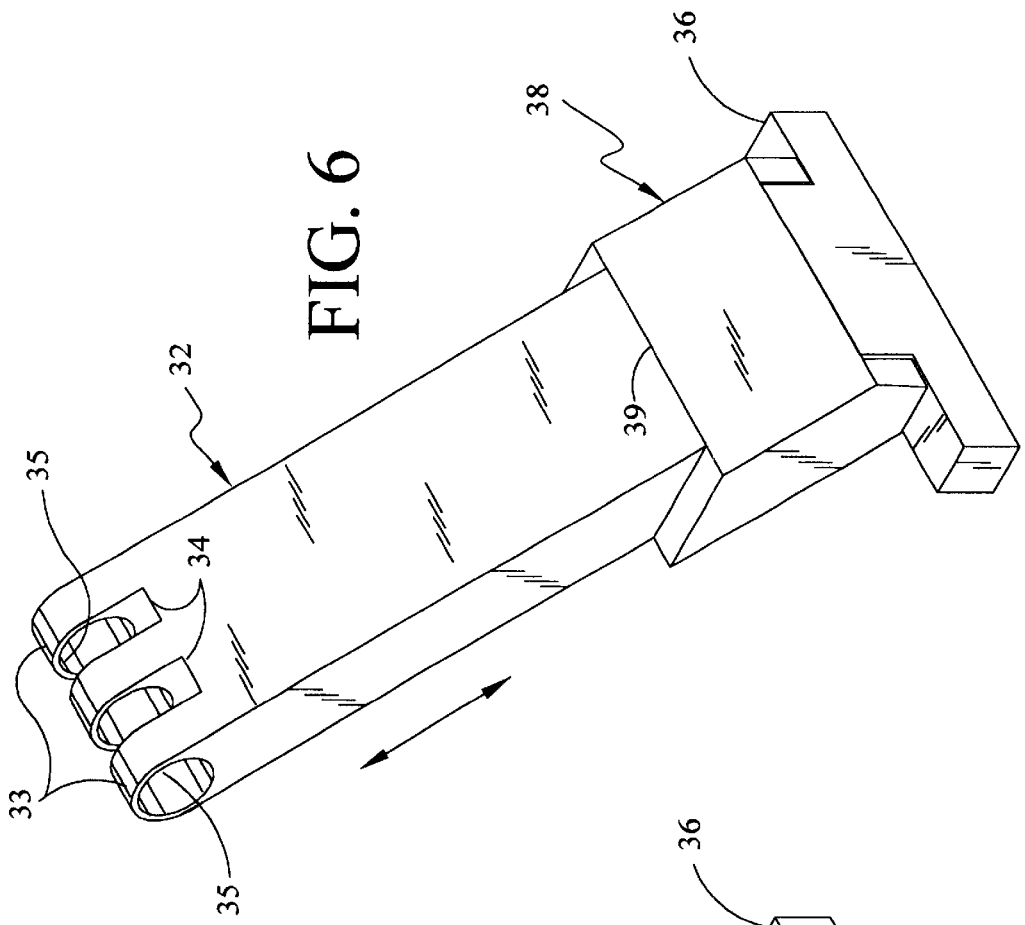
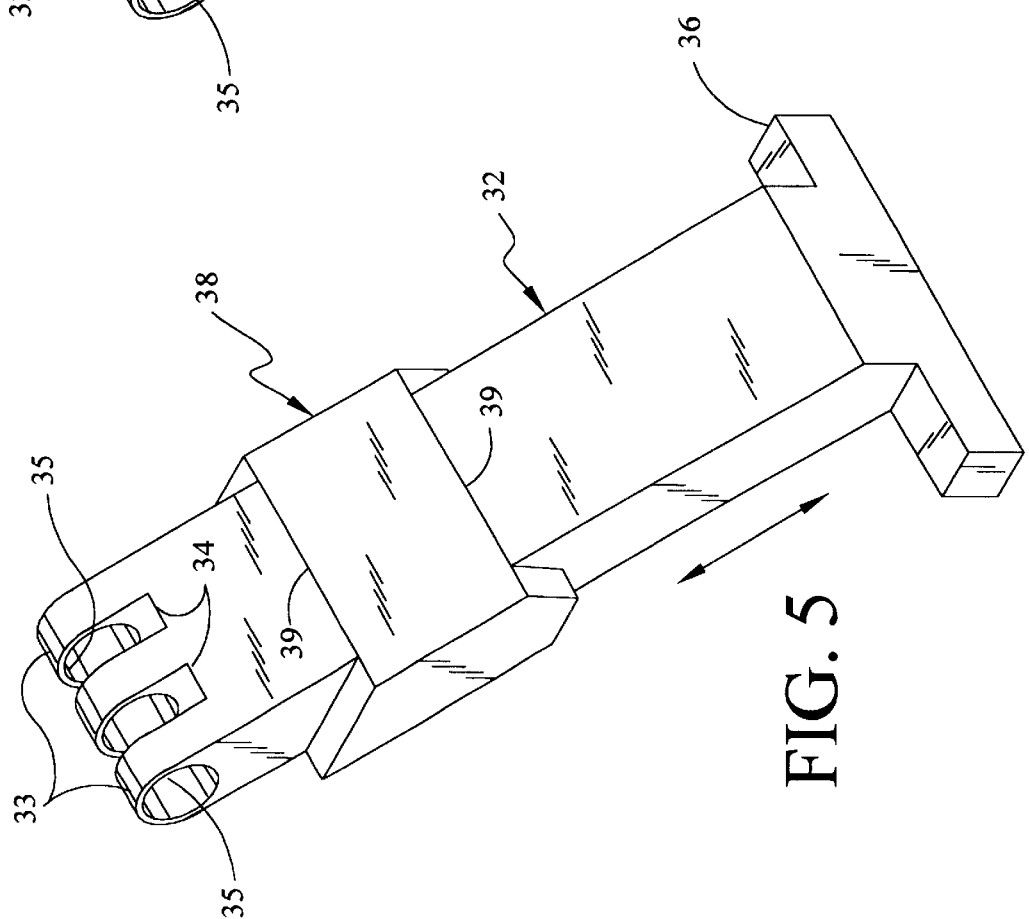

PORTABLE FOLDING TRAY FOR VEHICLES

BACKGROUND OF THE INVENTION

Field of the Invention

This invention relates to portable trays for use in vehicles and more particularly, to a portable folding tray which is characterized in a preferred embodiment by a bi-folding tray element having one end pivotally attached to a tray mount fitted with a pair of linearly-extendible and angularly-adjustable suction cups for removable attachment of the tray mount to the interior surface of a vehicle window. A tray adjustment bolt is provided in the tray mount and serves to selectively adjust the elevation of the bi-folding tray by clockwise or counterclockwise rotation of the tray adjustment bolt in the tray mount. A pair of tray leveling bolts is threaded in spaced-apart relationship with respect to each other in the tray mount, and each can be independently adjustably extended therefrom to facilitate horizontally stabilizing the bi-folding tray by engaging the vehicle window beneath the suction cups.

One of the problems that frequently exists with various types of trays, supports and similar devices for use in automobiles is that the devices are overly complex and unstable and lack the facility for quick and easy set-up, adjustment and removal. A common tray for use in vehicles and other environments is the lap pad, which has a hard, flat surface for reading, writing or other activities and includes a bottom sack or bag filled with beans, expanded foam pellets or the like, that contour to the lap or to another surface in the vehicle to provide a semi-stable surface for writing, reading or other activities. Other such trays are known in the art and typical of these is the "Vehicle Tray Table" detailed in U.S. Pat. No. 5,106,003, dated Apr. 21, 1992, to Mark Ma. The tray includes a flat, horizontal surface mounted on a frame adapted to be positioned on the dashboard of a vehicle. The tray is typically attached to the windshield by means of suction cups, and a trash bag support bucket can be suspended from the tray frame. U.S. Pat. No. 5,143,337, dated Sep. 1, 1992, to Max J. Tomayko, Jr., et al, details a "Food Server Device" which includes a frame and a mounting device for detachably mounting the frame to a vertical surface. The device also includes a flat tray which is pivotally mounted to the frame and can be deployed in a functional, horizontal position or a vertical, storage position. A cup holder is also mounted on the frame, adjacent to the tray. U.S. Pat. No. 5,443,018, dated Aug. 22, 1995, to Carl E. Cromwell, details a "Folding Tray For Attachment To A Vehicle Seat Back". The tray includes first and second boxes connected to a base member which can be attached to the back of a vehicle seat with a mounting harness. The boxes can be moved to an open position away from the seat back and the tops opened or folded up to form an easel for holding a book. U.S. Pat. No. 5,511,493, dated Apr. 30, 1996, to Donald A. Kanehl, Jr., details a "Vehicle Mountable Table", which table includes a pair of mounting brackets that may be secured to a door or seat of the vehicle. A table member is coupled to the mounting bracket by an adjustment assembly that permits vertical movement of the tray relative to the brackets. U.S. Pat. No. 5,667,119, dated Sep. 16, 1997, to Patricia J. Florence, details a "Packaged Fast Food and Condiment Holding Apparatus". The apparatus includes an L-shaped hanging bracket that can be suspended from the window segment of an automobile and includes a recessed portion for holding a container of such items as French fried potatoes and the like. U.S. Pat. No. 5,953,999, dated Sep. 21, 1999, to Donald Kanehl, details a "Removable Tray Assembly For A Vehicle". The removable tray assembly includes a tray, a mounting assembly having a mounting bracket removably supportable on the vehicle and a single-slide releasable locking mechanism that slidably supports and releasably locks the tray on the mounting bracket. The single-slide mechanism includes a movable, resilient pawl that operates to releasably lock the tray in a desired vertical position relative to the mounting bracket. U.S. Pat. No. 6,095,060, dated Aug. 1, 2000, to Mark Ma, details a "Vehicle Tray Apparatus" that can be secured to a windshield of a vehicle by means of a first pair of suction cups. Each of a second pair of suction cups is independently adjustable in height to be attached to the dashboard of the vehicle, and a frame to which the suction cups are fitted allows the tray to slide and rotate to a position below the dashboard at the level of the lap of a driver of a car. When not in use, the tray is returnable to the frame for storage.

It is an object of this invention to provide a portable folding tray for vehicles, which tray includes a tray element pivotally attached to a tray mount, which tray mount is provided with suction cups for removably mounting the tray mount on a window of a vehicle and a tray adjustment mechanism for selectively raising and lowering the tray element.

Another object of the invention is to provide a new and improved, portable folding tray having a bi-folding tray element pivotally attached to a tray mount and a pair of suction cups provided on the tray mount for removable attachment to the window of a vehicle and maintaining the tray in functional position inside the vehicle.

Still another object of the invention is to provide a new and improved, portable folding tray having a bi-folding tray element pivotally attached to a tray mount, a tray adjustment mechanism for selectively adjusting the height of the tray with respect to the tray mount and a pair of suction cups extendible from the tray mount for removable attachment to the window of a vehicle and maintaining the tray in functional position inside the vehicle.

Yet another object of this invention is to provide a portable folding tray for use in vehicles, which tray includes a bi-folding tray element pivotally attached to a tray mount fitted with a threaded tray adjustment bolt for selectively raising and lowering the tray element with respect to the tray mount, a pair of extendible and angularly-adjustable suction cups for removably mounting the tray on the window of the vehicle, and preferably two leveling bolts independently extendible from the tray mount for adjusting the horizontal orientation of the tray when the portable folding tray is mounted in functional configuration in the vehicle.

Still another object of this invention is to provide a portable folding tray provided with a tray element pivotally attached to a tray mount, which tray mount is provided with one or more suction cups for removably mounting the tray to the window of a vehicle and with at least one, and preferably a pair, of spaced-apart tray leveling bolts threaded into the tray mount for leveling the tray in horizontal orientation in the vehicle when the portable folding tray is mounted in functional configuration.

SUMMARY OF THE INVENTION

These and other objects of the invention are provided in a portable folding tray for vehicles, which tray is characterized in a preferred embodiment by a bi-folding tray segment or section pivotally attached to a tray mount fitted with a pair of spaced-apart, extendible and angularly-adjustable suction cups for removable mounting on the window of a vehicle and securing the tray in place; a threaded tray adjustment bolt seated in the tray mount and threadably engaging a pair of tray arms connected to the tray for selectively adjusting the elevation of the tray with respect to the tray mount; and a pair of spaced-apart, independently-extendible tray leveling bolts threaded in the tray mount for adjusting or stabilizing the horizontal orientation of the bi-folding tray by engaging the vehicle window beneath the suction cups when the portable folding tray is in functional configuration.

BRIEF DESCRIPTION OF THE DRAWINGS

The invention will be better understood by reference to the accompanying drawings, wherein:

FIG. 5 is a perspective view of a suction cup slide bracket element of the tray, with the suction cup slide bracket in retracted configuration; and FIG. 6 is a perspective view of the suction cup slide bracket in extended, functional configuration.

DESCRIPTION OF THE PREFERRED EMBODIMENTS

Figure 2:
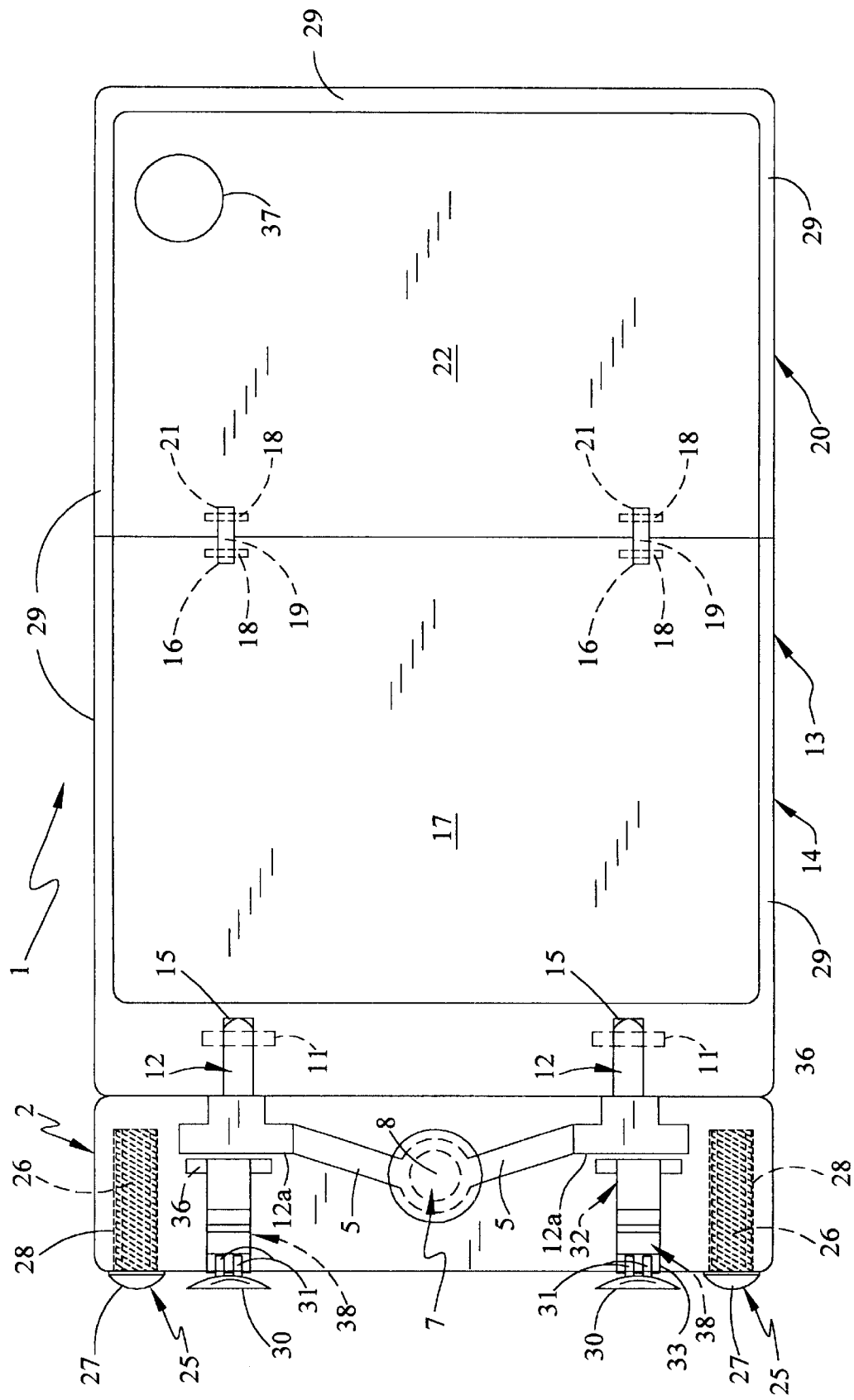
FIG. 2 is a top view of the portable folding tray of this invention, in extended, functional configuration and the suction cup elements of the tray in the retracted configuration on the tray mount.
Figure 3:
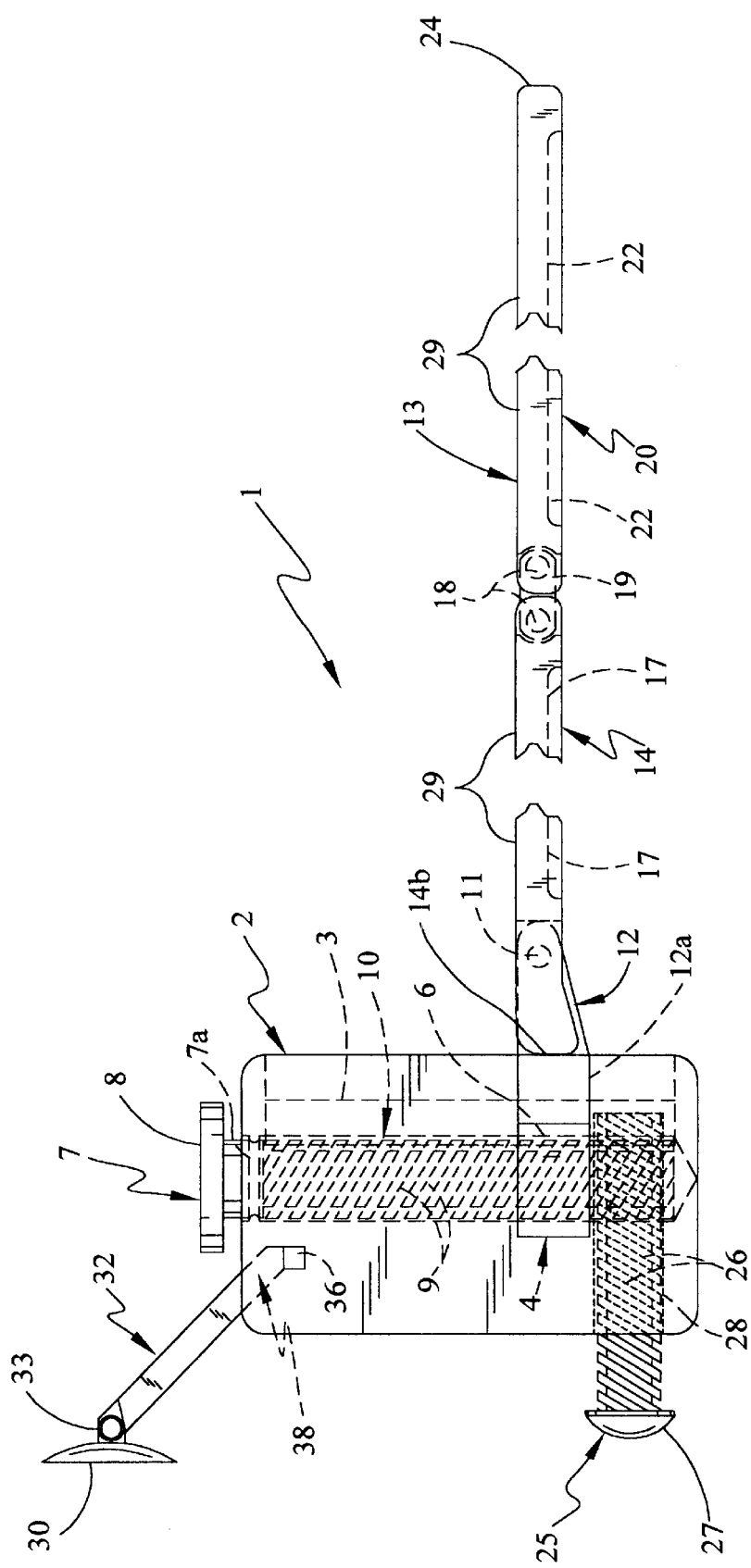
FIG. 3 is a side view, partially in section, of the portable folding tray illustrated in FIG. 2, with the suction cups (one of which is shown) illustrated in the extended, functional configuration.
Figure 4:
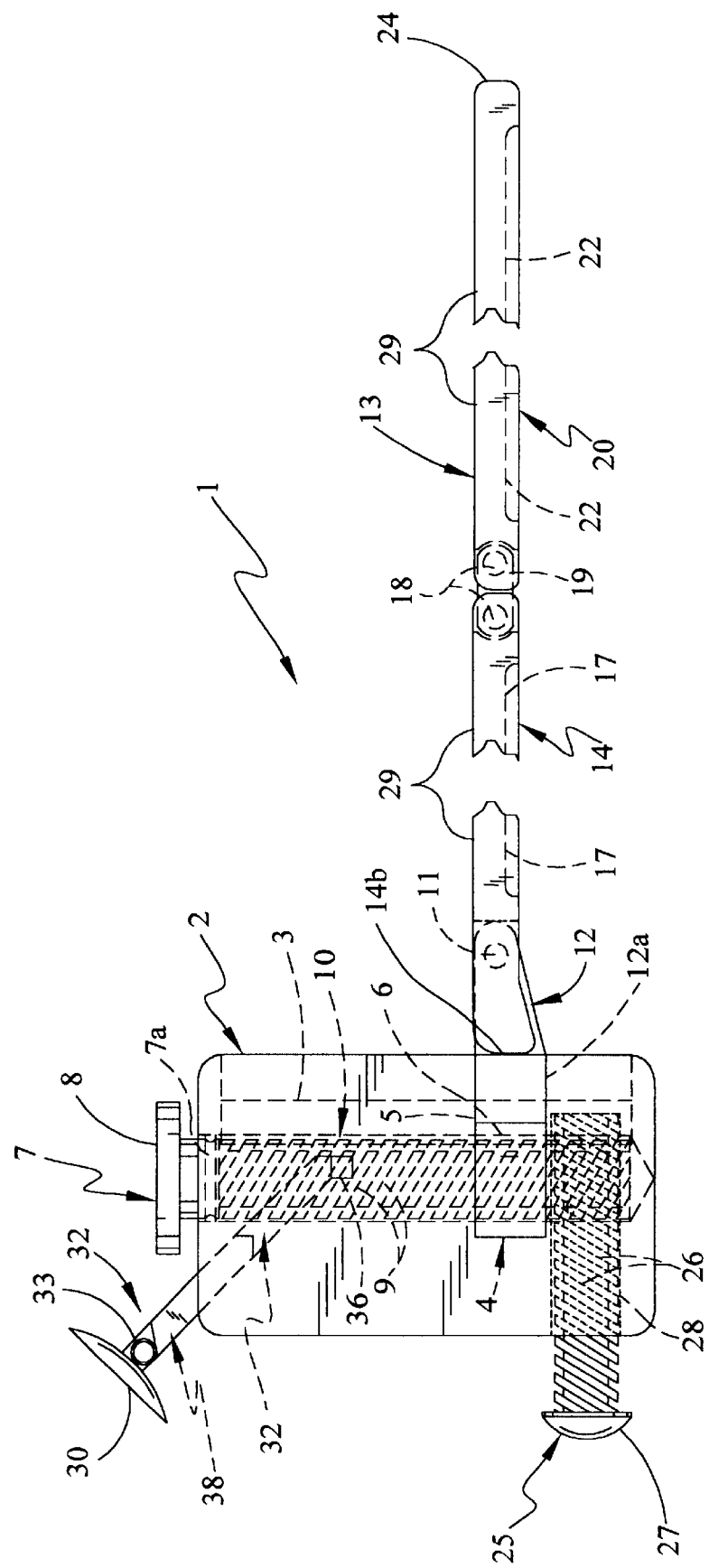
FIG. 4 is a side view, partially in section, of the portable folding tray illustrated in FIG. 3, with one of the suction cups shown in partially retracted configuration and one of the tray leveling bolts fully retracted into the tray mount.

Referring initially to FIGS. 2–4 of the drawings, the portable folding tray of this invention is generally illustrated by reference numeral 1. The portable folding tray 1 includes a segmented, bi-folding tray 13 which is adjustably mounted on a tray mount 2 as hereinafter described and is illustrated in functional, extending configuration in FIGS. 2–4. The tray mount 2 is fitted with an internal arm track 3, illustrated in phantom in FIG. 3, that accommodates the T-shaped arm base 12a of each of a pair of elongated tray arms 12, as well as a pair of connector arms 5 which extend from a common tray adjustment collar 4 and each of which terminates on the arm base 12a of the corresponding tray arm 12, as illustrated in FIG. 2. The tray adjustment collar 4 is internally-threaded to receive a tray adjustment bolt 7, by means of arm threads 6 of the tray adjustment collar 4 as further illustrated in FIG. 3. The tray adjustment bolt 7 is rotatably and non-threadably seated in a bolt bore 10 provided in the tray mount 2, and bolt threads 9 provided on the tray adjustment bolt 7 threadably interact with the collar threads 6 of the tray adjustment collar 4, as illustrated. The tray adjustment bolt 7 is fitted with a bolt head 8, and clockwise or counterclockwise rotation of the tray adjustment bolt 7 by grasping the bolt head 8 causes the threaded tray adjustment collar 4 to traverse the tray adjustment bolt 7 and raise or lower the attached connector arms 5. The diverging connector arms 5, connected to the respective tray arms 12 at the corresponding arm base 12a of each, in turn adjusts the elevation of the tray 13, which is pivotally attached to the extending end portions of the tray arms 12 by means of corresponding arm pivot pins 11, as hereinafter further described.

Figure 1:
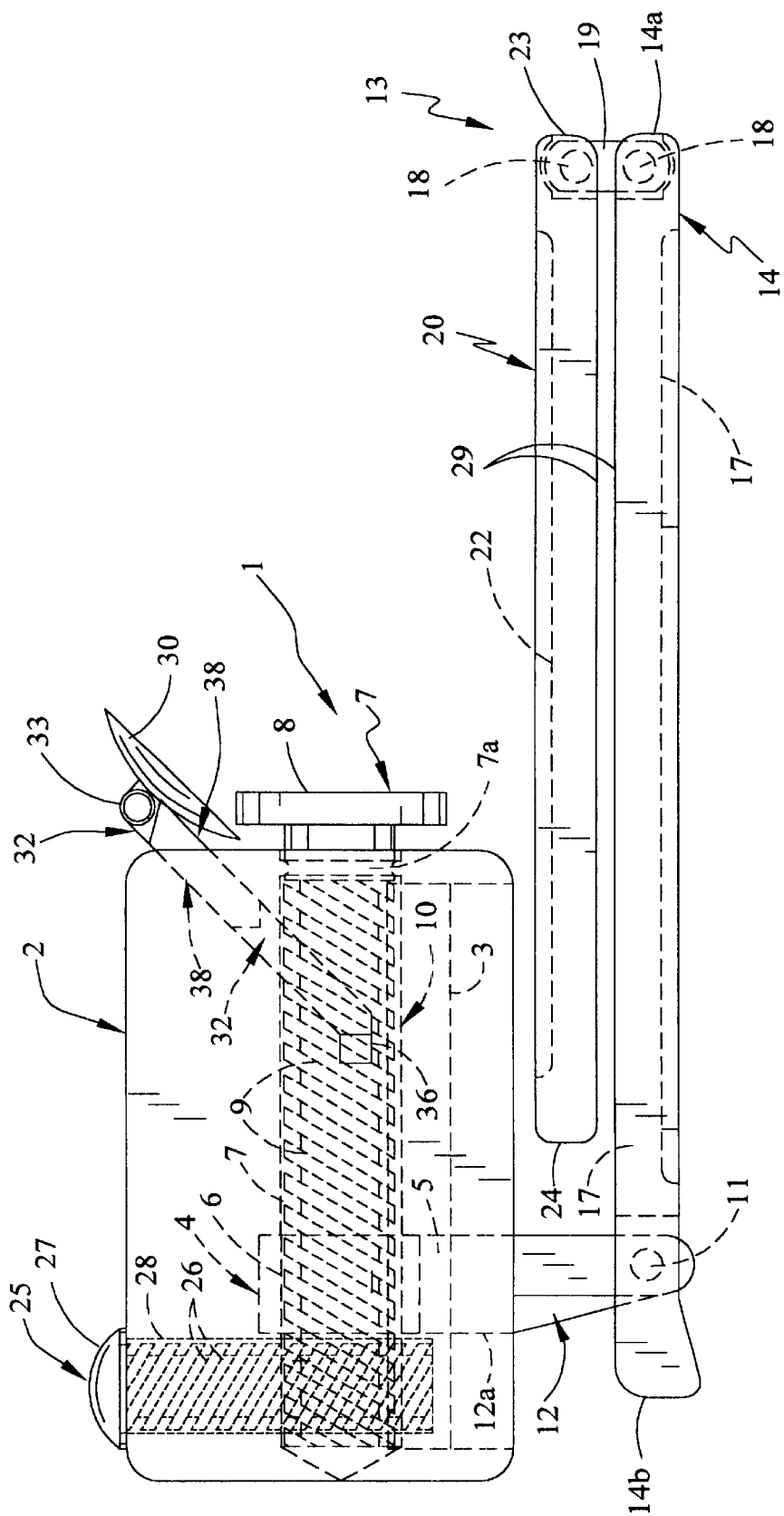
FIG. 1 is a side view of a preferred embodiment of the portable folding tray of this invention in folded configuration, more particularly illustrating a bi-folding tray element and retracted extendible suction cup elements, as well as tray adjustment bolt and tray leveling bolt elements of the invention.

Referring next to FIG. 1 and again to FIGS. 2–4 of the drawings, the tray 13 is preferably bi-folding in construction and illustrated in the folded, non-functional configuration in FIG. 1. The tray 13 is typically characterized by a proximal tray segment 14, having a proximal tray segment edge 14a (FIG. 1) at the extending end and a proximal tray segment seat 14b at the pivoted end thereof. As illustrated in FIG. 2, the pivoted end of the proximal tray segment 14 is secured to the extending ends of the respective tray arms 12 at proximal tray segment arm slots 15 by means of arm pivot pins 11, respectively. As further illustrated in FIG. 1, the proximal tray segment edge 14a lies adjacent to the distal tray segment edge 23 of a corresponding distal tray segment 20, having a distal tray segment end 24 projecting rearwardly toward the tray arms 12 while the tray 13 is in the folded configuration, as illustrated in FIG. 1. Accordingly, when the portable folding tray 1 is in the folded configuration illustrated in FIG. 1, the distal tray segment 20 extends alongside the proximal tray segment 14, as the distal tray segment 20 is connected to the proximal tray segment 14 by means of edge slot hinges 19 and corresponding edge slot pins 18, fitted into respective distal tray segment edge slots 21 and proximal tray segment edge slots 16, as illustrated in FIG. 2. The edge slot hinge elements 19 in the tray 13 facilitate extension of the distal tray segment 20 in substantially coplanar alignment with the proximal tray segment 14 when the portable folding tray 1 is in functional configuration, as hereinafter further described.

As further illustrated in FIGS. 1–4, each of a pair of tray leveling bolts 25 is provided with leveling bolt threads 26 and a leveling bolt head 27. The leveling bolt threads 26 are designed to threadably register with corresponding tray mount threads 28 provided in the tray mount 2 to facilitate threadable and adjustable extension of each of the tray leveling bolts 25 individually from the tray mount 2 for purposes which will be further hereinafter described.

Referring now to FIGS. 1, 2, 5 and 6 of the drawings, each of a pair of suction cups 30 is typically pivotally mounted on the extending end of a corresponding, elongated suction cup slide bracket 32, more particularly illustrated in FIGS. 5 and 6. In a preferred embodiment of the invention the suction cups 30 are attached to suction cup mount rings 31, as illustrated in FIG. 2, which suction cup mount rings 31 register with corresponding slide bracket ring openings 35 in slide bracket rings 33, shaped in the extending end of the suction cup slide brackets 32, as further illustrated in FIGS. 5 and 6. Slide bracket ring slots 34 separate the adjacent slide bracket rings 33 on the extending end of each of the suction cup slide brackets 32. A pivot pin (not illustrated) of selected design extends through the slide bracket ring openings 35 and registering suction cup mount rings 31 of each corresponding suction cup 30, to pivotally mount the suction cups 30 on the respective suction cup slide brackets 32 and allow pivoting of the suction cups 30 and the attached suction cup mount rings 31 with respect to the suction cup slide bracket 32, as hereinafter further described. Each of the suction cup slide brackets 32 is slidably mounted in the mount bracket opening 39 of a corresponding suction cup mount bracket 38, fixed in the tray mount 2, as further illustrated in FIGS. 1–4. Accordingly, it will be further appreciated from a consideration of FIGS. 1, 2, 5 and 6 of the drawings that the suction cup slide brackets 32 are free to slide upwardly and downwardly in the respective fixed suction cup mount brackets 38, while the slide bracket base 36, terminating one end of each of the suction cup slide brackets 32, is designed to prevent full extension of the respective suction cup slide brackets 32 from the suction cup mount brackets 38, as illustrated in FIG. 6.

Referring again to FIGS. 1–4 of the drawings, when it is desired to position the portable folding tray 1 into functional configuration, the tray arms 12 are initially pivoted on the respective arm pivot pins 11 to re-position the tray mount 2 from the horizontal position illustrated in FIG. 1 to the vertical position illustrated in FIGS. 3 and 4, such that the proximal tray segment 14 of the tray 13 extends from the tray mount 2 as illustrated in FIGS. 2–4, with the proximal tray segment seat 14b (FIG. 1) resting against the tray mount 2. The distal tray segment 20 is then pivoted on the respective edge slot pins 18 and the edge slot hinges 19 to extend the length of the supporting proximal tray segment 14. Each of the suction cup slide brackets 32 is then extended upwardly through the corresponding suction cup mount bracket 38 (mounted inside the tray mount 2), as illustrated in FIG. 3, to position the respective suction cups 30 in position for attachment to a window (not illustrated) of a vehicle, in order to suspend the portable folding tray 1 in functional position with the extended, bi-folding tray 13 approximately horizontally oriented, for functional use. Each of the suction cups 30 is typically capable of pivoting on the corresponding suction cup slide bracket 32 by operation of the corresponding pivot pin (not illustrated), which mounts the suction cup mount rings 31 (FIG. 2) on the suction cup slide bracket 32 as heretofore described. When each of the suction cups 30 has been attached to the window of the vehicle, the spaced-apart tray leveling bolts 25 are individually threadably extended by rotation from the tray mount 2, as further illustrated in FIG. 3, to engage the vehicle window beneath the suction cups 30 and level the tray 13. The tray 13 is now ready for use to support such items as a book (not illustrated), lap top computer (not illustrated) or the like, and is stabilized in position by the suction cups 30 and the corresponding tray leveling bolts 25. Rotation of the tray elevation bolt 7 in the bolt bore 10 by grasping the bolt head 8 raises and lowers the tray 13, as desired, depending upon the direction of rotation of the bolt head 8, by progressively engaging the rotating bolt threads 9 with the stationary interior collar threads 6 of the tray adjustment collar 4. A shoulder 7a (FIGS. 1, 3 and 4) in the tray mount 2 at the bolt bore 10 serves to prevent the tray elevation bolt 7 from exiting the bolt bore 10. As illustrated in FIGS. 1–4, a proximal tray segment inset 17 and a distal tray segment inset 22 can be optionally provided in the lower surfaces of the respective proximal tray segment 14 and distal tray segment 20 to reduce weight and a tray edge 29 can be optionally provided around the top periphery of the proximal tray segment 14 and distal tray segment 20 to contain small items such as paper clips (not illustrated) and the like. A cup recess 37 can also be provided, typically in the distal tray segment 20, as particularly illustrated in FIG. 2 of the drawings.

Re-positioning of the portable folding tray 1 from the functional position illustrated in FIGS. 2–4 to the storage position illustrated in FIG. 1 is accomplished by initially removing the suction cups 30 from adhesion to the window of the vehicle and linearly retracting the suction cup slide brackets 32 in the corresponding suction cup mount brackets 38 and the tray mount 2, as illustrated in FIG. 4. The respective tray leveling bolts 25 are then fully threaded into the tray mount 2 as further illustrated in FIG. 4, and the tray 13 is folded by initially folding the distal tray segment 20 on the edge slot pins 18 and the edge slot hinges 19 to a position over and adjacent to the proximal tray segment 14. The entire folded tray 13 is then pivoted on the arm pivot pins 11 from the position illustrated in FIGS. 2–4 to the position illustrated in FIG. 1, such that the proximal tray segment seat 14b is extended from the tray mount 2 and the vertical axis of the tray mount 2 is disposed in parallel relationship to the distal tray segment 20 and proximal tray segment 14, as illustrated.

It will be appreciated by those skilled in the art that the portable folding tray of this invention offers a compact, highly-stable, easily-stored tray for use in vehicles or otherwise, as desired. By use of the bi-folding tray segments, the tray is characterized by a tray element of sufficient size to support substantially any desired object while traveling. Furthermore, the suction cups are sized and designed to removably engage the window of a vehicle or structure and to facilitate easy removal, in conventional fashion. Moreover, the respective tray leveling bolts are easily extended from and retracted into the tray mount, and the tray adjustment bolt can be utilized to further adjust the tray up and down, as desired, without having to disengage and re-engage the respective suction cups.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A portable folding tray for mounting on a window of a vehicle, comprising a tray mount; a tray carried by said tray mount; at least one suction cup attached to said tray mount for removably engaging the vehicle window; and a threaded tray adjustment bolt rotatably seated in said tray mount and engaging said tray, whereby the elevation of said tray is adjusted responsive to rotation of said threaded tray adjustment bolt.

2. A portable folding tray for mounting on a window of a vehicle, comprising a tray mount; a tray carried by said tray mount, said tray comprising a proximal tray segment pivotally attached to said tray mount and a distal tray segment pivotally attached to said proximal tray segment, said distal tray segment selectively foldable alongside said proximal tray segment in folded configuration and extended in coplanar relationship from said proximal tray segment in functional configuration; at least one suction cup attached to said tray mount for removably engaging the vehicle window; a threaded tray adjustment bolt rotatably seated in said tray mount and engaging said tray, whereby the elevation of said tray is adjusted responsive to rotation of said threaded tray adjustment bolt.

3. The portable folding tray of claim 2 comprising a pair of tray arms extending from said tray to said tray mount and wherein said tray adjustment bolt engages said pair of tray arms.

4. The portable folding tray of claim 2 comprising a tray leveling mechanism selectively extendible from said tray mount for engaging the vehicle window and leveling said tray.

5. The portable folding tray of claim 4 comprising a pair of tray arms extending from said tray to said tray mount and wherein said tray adjustment bolt engages said pair of tray arms.

6. A portable folding tray for mounting on a window of a vehicle, comprising a tray mount; a tray carried by said tray mount; at least one suction cup attached to said tray mount for removably engaging the vehicle window; a threaded tray adjustment bolt rotatably seated in said tray mount and engaging said tray, whereby the elevation of said tray is adjusted responsive to rotation of said threaded tray adjustment bolt; and a tray leveling mechanism selectively extendible from said tray mount for engaging the vehicle window and leveling said tray.

7. The portable folding tray of claim 6 comprising a pair of tray arms extending from said tray to said tray mount and wherein said tray adjustment bolt engages said pair of tray arms.

8. A portable folding tray for removably mounting on the window of a vehicle, comprising a tray mount; a tray pivotally attached to said tray mount for selective orientation adjacent to said tray mount in a stored configuration and extended from said tray mount in a functional configuration; a tray adjustment mechanism provided in said tray mount, said tray adjustment mechanism engaging said tray for selectively adjusting the elevation of said tray responsive to manipulation of said tray adjustment mechanism; a pair of suction cup slide brackets slidably extendible from said tray mount; and a suction cup provided on each of said pair of suction cup slide brackets for removably engaging the vehicle window.

9. A portable folding tray for mounting on a window of a vehicle, comprising a tray mount; a pair of tray arms extending from said tray mount; a tray carried by said pair of tray arms; at least one suction cup attached to said tray mount for removably engaging the vehicle window; and a threaded tray adjustment bolt rotatably seated in said tray mount and engaging said pair of tray arms, whereby the elevation of said tray is adjusted responsive to rotation of said threaded tray adjustment bolt.

* * * * *